US011647031B2

(12) United States Patent
Levine et al.

(10) Patent No.: US 11,647,031 B2
(45) Date of Patent: *May 9, 2023

(54) DETERMINING AN ORIGIN SERVER IS POTENTIALLY COMPROMISED

(71) Applicant: CLOUDFLARE, INC., San Francisco, CA (US)

(72) Inventors: Jonathan Philip Levine, San Francisco, CA (US); Rustam Xing Lalkaka, San Francisco, CA (US); Evan Johnson, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,372

(22) Filed: Feb. 8, 2022

(65) Prior Publication Data

US 2022/0166786 A1 May 26, 2022

Related U.S. Application Data

(63) Continuation of application No. 16/810,187, filed on Mar. 5, 2020, now Pat. No. 11,245,710.

(51) Int. Cl.
*H04L 9/40* (2022.01)
*H04L 67/02* (2022.01)

(52) U.S. Cl.
CPC ...... *H04L 63/1416* (2013.01); *H04L 63/1433* (2013.01); *H04L 63/1441* (2013.01); *H04L 63/1483* (2013.01); *H04L 67/02* (2013.01)

(58) Field of Classification Search
CPC .. H04L 63/1416; H04L 63/1483; H04L 67/02
See application file for complete search history.

(56) References Cited

U.S. PATENT DOCUMENTS 8,856,937 B1 * 10/2014 Wuest ............... G06F 21/56
713/188
2002/0010798 A1 1/2002 Ben-Shaul et al.
(Continued)

OTHER PUBLICATIONS

Notice of Allowance, U.S. Appl. No. 16/810,187 dated May 10, 2021, 12 pages.
(Continued)

*Primary Examiner* — Chirag R Patel
(74) *Attorney, Agent, or Firm* — Nicholson De Vos Webster & Elliott LLP

(57) ABSTRACT

An edge server receives a request from a client network application for a web page hosted at an origin server. The edge server transmits the requested web page in a response. The edge server accesses an edge server request log to retrieve a log entry associated with the request for the web page, where the log entry associated with the request for the web page includes information regarding the request and the response. The edge server retrieves one or more characteristics of an asset of the web page, where each characteristics has an expected value. The edge server determines whether the origin server is compromised when a value for a characteristic is not within a threshold range of the expected value for the characteristic of the asset and performs a mitigation action in response.

18 Claims, 4 Drawing Sheets

(56) References Cited

U.S. PATENT DOCUMENTS

| | | | | |
|---|---|---|---|---|
| 2006/0068755 A1* | 3/2006 | Shraim | ............... | H04M 15/47 |
| | | | | 455/410 |
| 2016/0378983 A1* | 12/2016 | Spurlock | ............... | G06F 21/567 |
| | | | | 726/23 |
| 2017/0366576 A1* | 12/2017 | Donahue | ............. | H04L 63/1416 |
| 2018/0063190 A1* | 3/2018 | Wright | ............... | H04L 63/1425 |
| 2020/0010798 A1* | 1/2020 | Sawyer | ................ | C08F 220/56 |
| 2020/0201666 A1* | 6/2020 | Aron | ...................... | H04L 67/53 |

OTHER PUBLICATIONS

Notice of Allowance, U.S. Appl. No. 16/810,187, dated Sep. 29, 2021, 7 pages.

* cited by examiner

DETERMINING AN ORIGIN SERVER IS POTENTIALLY COMPROMISED

CROSS-REFERENCE TO RELATED APPLICATIONS

This application is a continuation of U.S. application Ser. No. 16/810,187 filed Mar. 5, 2020, which is hereby incorporated by reference

FIELD

Embodiments of the invention relate to the field of network communications, and more specifically, to determining an origin server is potentially compromised.

BACKGROUND

Internet hosts are concerned with maintaining high security, performance, and reliability of their hosted resources, such as websites. As the popularity of a resource increases, so does the amount of network traffic that is directed to the resource. This network traffic can include resources, such as web pages, that request for, and transmit, sensitive information, including personal information (e.g., social security numbers, date of birth, etc.), user account information (e.g., passwords, security codes), and financial data (e.g., account numbers, credit card numbers, etc.). An origin server can be compromised if a hacker gains access to the origin server and inserts malicious code that replaces or modifies an asset of a web page (e.g., JavaScript) or an asset of a website (e.g., an SSL certificate). If an origin server hosting such resources is compromised, it can lead to the exposure or leak of sensitive information.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
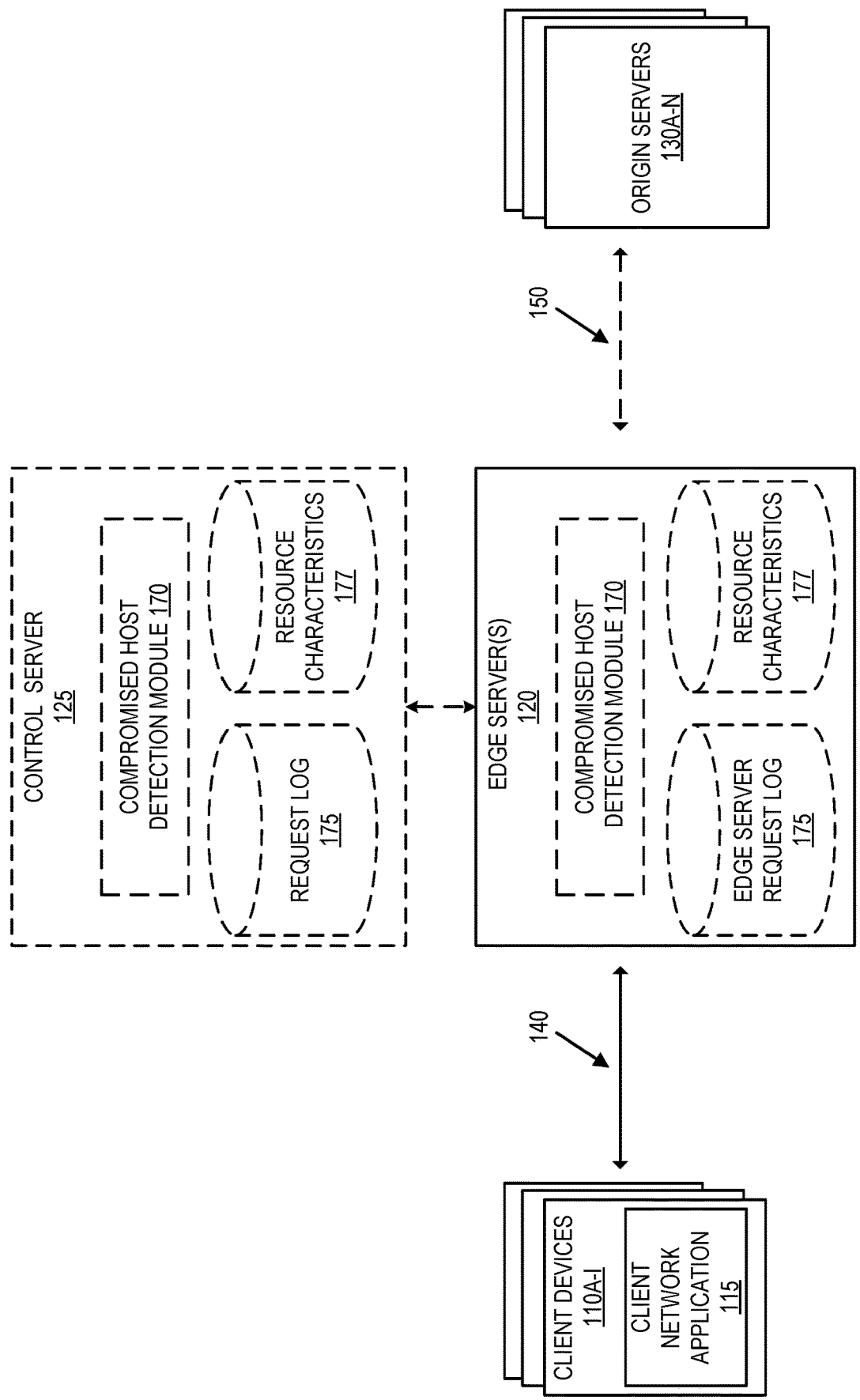
FIG. 1 illustrates an exemplary networked system according to some embodiments described herein.

Origin servers host resources that are accessible by various client devices. An origin server can be compromised when a malicious user gains access using stolen or guessed security credentials, through security breaches or loopholes, or through other ways. Once compromised, a malicious user can modify resources and/or assets of resources. For example, a malicious user can inject malicious code into a script (e.g. JavaScript) of a web page that can capture sensitive information (e.g., credentials, financial information, etc.) sent in network traffic between client devices and origin servers related to accessing such resources.

In conventional solutions, an external security system can be used to reduce or limit the risks and effects of security breaches caused by compromised origin servers. For example, an external security system can periodically probe one or more of an origin server or client device to retrieve and evaluate network traffic to determine whether there are any indications that the origin server is compromised. However, external security systems that probe into the network traffic flow either require an additional API to retrieve the network traffic from the origin server or client device, or additional infrastructure at the origin server or client device for periodically transmitting network traffic to the external security system.

The embodiments described herein provide mechanisms for determining whether an origin server is potentially compromised. In an embodiment, this determination is based on monitoring one or more characteristics of resources hosted by the origin server. In one embodiment, an edge server handles network traffic between a client device and an origin server, including requests to access resources (e.g., web pages) hosted by the origin server. As part of handling the requests to access resources, the edge server can store data related to the request, and any responses to the request, in a log entry in an edge server request log. The edge server can access the edge server request log to retrieve a log entry associated with the request. The edge server can retrieve one or more characteristics of an asset of the web page from the log entry associated with the request. In some embodiments, each asset of the web page has an expected value for each of one or more characteristics of the asset. Based on the determining that a value for a characteristic of the asset of the web page is not within a threshold range of an expected value for the characteristic of the asset, the edge server can determine that the origin server is likely compromised. In response to making the determination that the origin server is likely compromised, the edge server can perform a mitigation action.

Embodiments of the invention provide many technical advantages, in addition to addressing the deficiencies of previous solutions. For example, by utilizing an edge server that is a proxy for the network traffic between client devices and origin servers, no additional infrastructure is required. Further, because the edge server can make the determination as to whether there are indications that the origin server is compromised, mitigating actions can be initiated more quickly and efficiently than if an external security system is involved.

FIG. 1 illustrates an exemplary networked system according to some embodiments described herein. The exemplary networked system illustrated in FIG. 1 includes edge server(s) 120 that are situated between client devices 110A-I and origin server(s) 130A-N. In one embodiment, edge server(s) 120 are proxy servers. In one embodiment, edge server(s) 120 is configured to receive requests to access and/or modify the resources hosted by the origin servers 130A-N, and further receives responses to such requests with the requested resources from the origin servers 130A-N. For example, web traffic (e.g., HTTP requests/responses, HTTPS requests/responses, SPDY requests/responses, HTTP/2 requests, responses, etc.) for domains handled by origin servers 130A-N may be received via transport connection 140 and processed at edge server(s) 120. The transport connection 140 may be a TCP connection, a Quick UDP Internet Connection (QUIC), or other transport layer protocol connection. When required, edge server(s) 120 can forward or send requests to, and receive responses from, origin servers 130A-N, via transport connection 150.

In one embodiment, as part of handling requests to access resources, the edge server(s) 120 is further configured to retrieve and/or analyze properties of each request and each response and, based at least on those properties, perform actions.

Examples of client devices 110A-I include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of client devices 110A-I executes client network application 115 that is capable of transmitting and/or receiving network traffic. For example, client network application 115 may be a web browser or other application that can access network resources (e.g., web pages, images, word processing documents, PDF files, movie files, music files, or other computer files).

Examples of origin servers 130A-N include computing devices that may serve and/or generate network resources (e.g., web pages, images, word processing documents, PDF files movie files, music files, or other computer files). Origin servers 130A-N may also be another edge server to the server that serves and/or generates network resources. Although not illustrated in FIG. 1, it should be understood that the network resources of origin servers 130A-N may be stored separately from the device that responds to the requests.

The service may also include control server 125, which may be owned or operated by the service. In some embodiments, control server 125 may receive a command from edge server(s) 120 to determine, from the properties of requests and responses, whether a host or origin server is, or has indications of being, compromised.

In one embodiment, edge server(s) 120, or optionally control server 125, includes compromised host detection module 170 and a plurality of data stores, including edge server request log 175 and resource characteristics database 177. Compromised host detection module 170 is configured to analyze request messages from client devices 110A-I and response messages from origin servers 130A-N, including by accessing edge server request log 175 and resource characteristics database 177. Edge server request log 175 stores log entries associated with requests received from client devices 110A-I. Each log entry in edge server request log 175 includes information related to a request and to any responses to the request. In some embodiments, resource characteristics database 177 stores metadata indicating characteristics of resources. In some embodiments, resource characteristics database 177 also, or alternatively, stores copies of the assets of resources. For example, resource characteristics database 177 can store one or more characteristics of an asset of the web page (e.g., JavaScript), such as a fingerprint of the asset and/or the size of the asset, and/or can store a security certificate fingerprint associated with a website containing the web page. Based on the information from edge server request log 175 and resource characteristics database 177, compromised host detection module 170 can make a determination as to whether an origin server responding to the request is compromised. In some embodiments, determining whether an origin server responding to the request is compromised is based on at least one characteristic of an asset of the web page, at least one characteristic of a website containing the web page, or a combination of both.

In one embodiment, edge server 120 generates a request log entry for an HTTP request that includes some or all of the following fields:

| FIELD | VALUE | TYPE |
|---|---|---|
| botScore | Bot Score | int |
| CacheCacheStatus | unknown \| miss \| expired \| updating \| stale \| hit \| ignored \| bypass \| revalidated | string |
| CacheResponseBytes | Number of bytes returned by the cache | int |
| CacheResponseStatus | HTTP status code returned by the cache to the edge; all requests (including non-cacheable ones) go through the cache; also see CacheStatus field | int |
| CacheTieredFill | Tiered Cache was used to serve this request | bool |
| ClientASN | Client AS number | int |
| ClientCountry | Country of the client IP address | string |
| ClientDeviceType | Client device type | string |
| ClientIP | IP address of the client | string |
| ClientIPClass | unknown \| clean \| badHost \| searchEngine \| whitelist \| greylist \| monitoringService \| securityScanner \| noRecord \| scan \| backupService \| mobilePlatform \| tor | string |
| ClientRequestBytes | Number of bytes in the client request | int |
| ClientRequestHost | Host requested by the client | string |
| ClientRequestMethod | HTTP method of client request | string |
| ClientRequestPath | URI path requested by the client | string |
| ClientRequestProtocol | HTTP protocol of client request | string |
| ClientRequestReferer | HTTP request referrer | string |
| ClientRequestURI | URI requested by the client | string |
| ClientRequestUserAgent | User agent reported by the client | string |
| ClientSSLCipher | Client SSL cipher | string |
| ClientSSLProtocol | Client SSL (TLS) protocol | string |
| ClientSrePort | Client source port | int |
| EdgeColoCode | IATA airport code of data center that received the request | string |
| EdgeColoID | edge colo id | int |
| EdgeEndTimestamp | Timestamp at which the edge finished sending response to the client | int or string |
| EdgePathingOp | Indicates what type of response was issued for this request (unknown = no specific action) | string |

-continued

| FIELD | VALUE | TYPE |
|---|---|---|
| EdgePathingSrc | Details how the request was classified based on security checks (unknown = no specific classification) | string |
| EdgePathingStatus | Indicates what data was used to determine the handling of this request (unknown = no data) | string |
| EdgeRateLimitAction | The action taken by the blocking rule; empty if no action taken | string |
| EdgeRateLimitID | The internal rule ID of the rate-limiting rule that triggered a block (ban) or simulate action. 0 if no action taken | int |
| EdgeRequestHost | Host header on the request from the edge to the origin | string |
| EdgeResponseBytes | Number of bytes returned by the edge to the client | int |
| EdgeResponseCompressionRatio | Edge response compression ratio | float |
| EdgeResponseContentType | Edge response Content-Type header value | string |
| EdgeResponseStatus | HTTP status code returned by edge server to the client | int |
| EdgeServerIP | IP of the edge server making a request to the origin | string |
| EdgeStartTimestamp | Timestamp at which the edge received request from the client | int or string |
| FirewallMatchesActions | Array of actions the edge server firewall products performed on this request. The individual firewall products associated with this action be found in FirewallMatchesSources and their respective RuleIds can be found in FirewallMatchesRuleIDs. The length of the array is the same as FirewallMatchesRuleIDs and FirewallMatchesSources. Possible actions are allow \| log \| simulate \| drop \| challenge \| jschallenge \| connectionClose | array of actions (strings) |
| FirewallMatchesSources | The firewall products that matched the request. The same product can appear multiple times, which indicates different rules or actions that were activated. The RuleIDs can be found in FirewallMatchesRuleIDs, the actions can be found in FirewallMatchesActions. The length of the array is the same as FirewallMatchesRuleIDs and FirewallMatchesActions. Possible sources are asn \| country lip \| ipRange \| securityLevel \| zoneLockdown \| waf \| firewallRules \| uaBlock \| rateLimit \| bic \| hot \| l7ddos | array of product names (strings) |
| FirewallMatchesRuleIDs | Array of RuleIDs of the firewall product that has matched the request. The firewall product associated with the RuleID can be found in FirewallMatchesSources. The length of the array is the same as FirewallMatchesActions and FirewallMatchesSources. | array of RuleIDs (strings) |
| OriginIP | IP of the origin server | string |
| OriginResponseBytes (deprecated) | Number of bytes returned by the origin server | int |
| OriginResponseHTTPExpires | Value of the origin 'expires' header in RFC1123 format | string |
| OriginResponseHTTPLastModified | Value of the origin 'last-modified' header in RFC1123 format | string |
| OriginResponseStatus | Status returned by the origin server | int |
| OriginResponseTime | Number of nanoseconds it took the origin to return the response to edge | int |
| OriginSSLProtocol | SSL (TLS) protocol used to connect to the origin | string |
| ParentRayID | Ray ID of the parent request if this request was made using a Worker script | string |
| RayID | ID of the request | string |
| SecurityLevel | The security level configured at the time of this request. This is used to determine the sensitivity of the IP Reputation system | string |
| WAFAction | Action taken by the WAF, if triggered | string |
| WAFFlags | Additional configuration flags: simulate (0x1) \| null | string |
| WAFMatchedVar | The full name of the most-recently matched variable | string |
| WAFProfile | low \| med \| high | string |
| WAFRuleID | ID of the applied WAF rule | string |

-continued

| FIELD | VALUE | TYPE |
|---|---|---|
| WAFRuleMessage | Rule message associated with the triggered rule | string |
| WorkerCPUTime | Amount of time in microseconds spent executing a worker, if any | int |
| WorkerStatus | Status returned from worker daemon | string |
| WorkerSubrequest | Whether or not this request was a worker subrequest | bool |
| WorkerSubrequestCount | Number of subrequests issued by a worker when handling this request | int |
| ZoneID | Internal zone ID | int |

In one embodiment, edge server 120 generates a request log entry for an HTTP request that includes some or all of the following additional fields:

| FIELD | VALUE | TYPE |
|---|---|---|
| EdgeOriginValidationMode | Edge server origin validation mode used | enum |
| CertficateFingerprint | Output of ngx_ssl_get_fingerprint | bytes |
| CipherNegotiated | Cipher negotiated | 16 bit enum |
| TLSVersion | TLS version | int |

Figure 2:
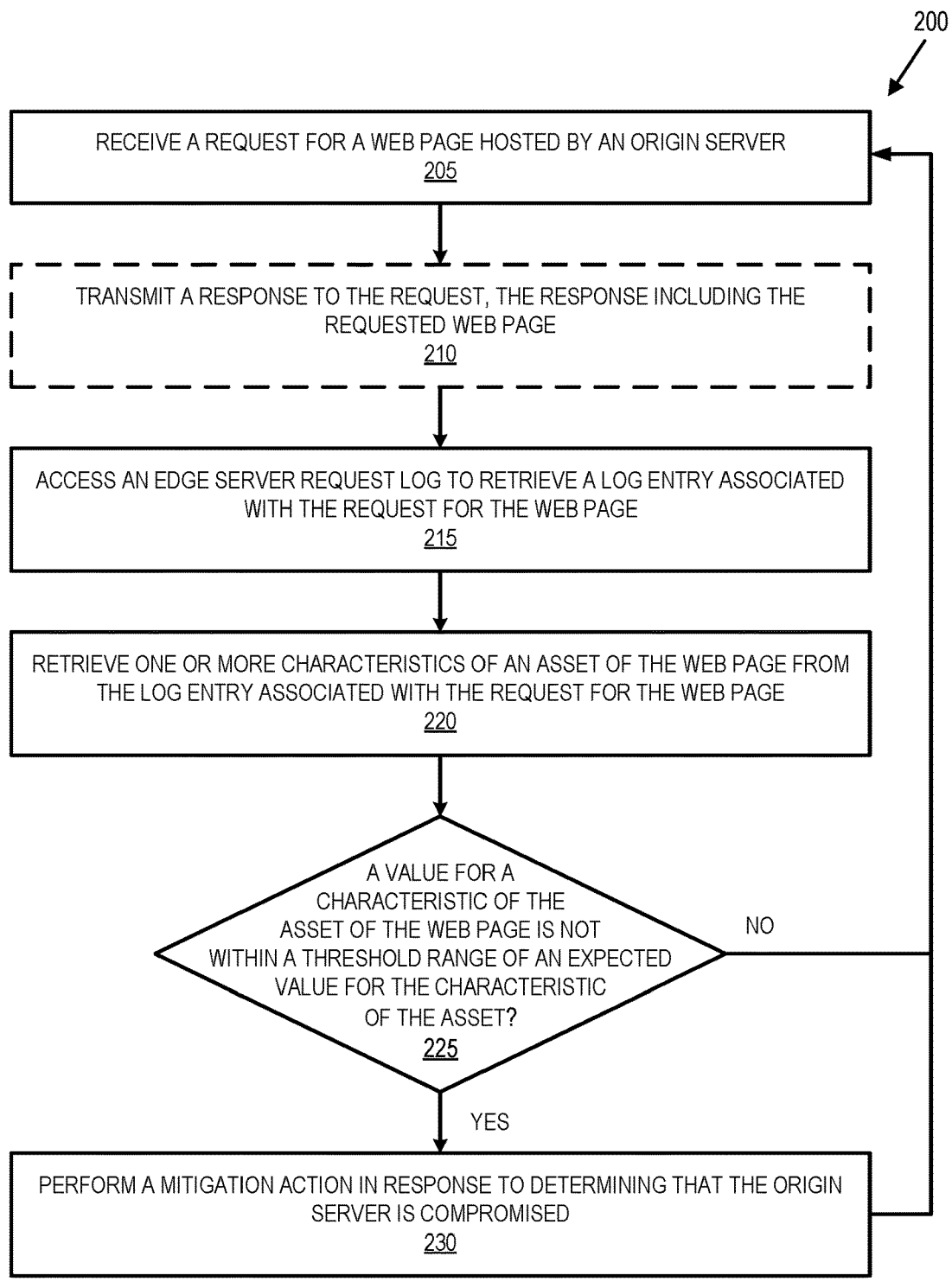
FIG. 2 is a flow diagram that illustrates exemplary operations for determining whether an origin server is compromised based on one or more characteristics of a resource requested from the origin server according to an embodiment.

FIG. 2 is a flow diagram 200 that illustrates exemplary operations for determining whether an origin server is compromised based on one or more characteristics of a resource requested from the origin server according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2. The operations of FIG. 2 are described as being performed by one or more edge servers (e.g., edge server(s) 120). In some embodiments, the operations are performed by compromised host detection module 170 operating on edge server(s) 120.

In operation 205, an edge server (e.g., edge server 120) receives a request for a resource (e.g., a web page) hosted by an origin server. In some embodiments, edge server 120 receives the request message from a client device (e.g., client device 110A) directed to an origin server (e.g., origin server 130A). Edge server 120 utilizes transport connection 140 to handle request messages from client device 110A and response messages directed to client device 110A (e.g., HTTP/S request/responses). For example, edge server 120 receives an HTTP "GET" request to access a resource hosted by origin server 130A via transport connection 140. In one embodiment, the requested resource is a web page (e.g., an HTML page) located at, e.g., www.example.com/index.html. The request message may include a request for an action to be performed on the resource. In one embodiment, edge server 120 receives the request message because of a DNS for the hostname resolving to an IP address assigned to edge server 120 instead of resolving to an IP address of the origin server hosting the resource.

In some embodiments, after receiving the request for the web page, edge server 120 generates a log entry in an edge server request log (e.g., edge server request log 175). In such embodiments, when edge server 120 receives the request, edge server 120 can store data related to the connecting client (e.g., client device 110A) and the request in the log entry, including, but not limited to, a client device type, a client IP address, the number of bytes in the client request, the host or origin server requested by the client, the URI path requested, the HTTP protocol of the request, the request path to the edge server, a timestamp of when the request was received, etc. In one embodiment, edge server 120 generates the log entry associated with the request for the web page with an identifier generated in response to the receiving the request or using data from the request.

In operation 210, edge server 120 transmits a response to the request, where the response includes the requested web page. In some embodiments, edge server 120 determines whether the requested web page is stored in a cache associated with, or otherwise accessible by, edge server 120. When edge server 120 determines that the web page requested by client device 110A is available in the cache, edge server 120 retrieves the web page from the cache. In such embodiments, edge server 120 can retrieve the requested web page from the cache without sending the request to origin server 130A. When edge server 120 determines that the web page requested by client device 110A is not available in the cache, or edge server 120 cannot access the requested web page in the cache, edge server 120 retrieves the requested web page from origin server 130A. For example, edge server 120 can send the HTTP request containing the "GET" request to origin server 130, and edge server 120 can receive an HTTP response back from origin server 130, via transport connection 150 established between origin servers 130A-N and edge server 120.

In some embodiments, as part of the process of transmitting the response to the request, edge server 120 stores data related to the response to the request in edge server request log 175. Edge server 120 can store the data related to the response to the request in the same log entry as edge server 120 previously stored data related to the request for the web page (as described in operation 205). The data related to the response stored in the log entry can include, but is not limited to, an IP address of the origin server, the number of bytes returned by the origin server, the number of bytes returned by the edge server to the client, the number of bytes returned by the cache, etc.

In operation 215, edge server 120 accesses edge server request log 175 to retrieve a log entry associated with the request for the web page. In some embodiments, edge server 120 retrieves a specific log entry. In other embodiments, edge server 120 retrieves a plurality of log entries. For example, edge server 120 periodically (e.g., every five minutes, every thirty minutes, etc.) retrieves the log entries for a number of request/response processes that have been performed over an intervening amount of time since a prior retrieval. For example, edge server 120 can retrieve all or a subset of stored log entries for request/response processes from edge server request log 175. Each log entry in the edge server request log can include information regarding the request for the web page and information regarding the response to the request for the web page. Following retrieval of the stored log entries, edge server 120 can evaluate one or more responses to determine whether one or more characteristics from the one or more responses are as expected (e.g., asset size or fingerprint matches stored metadata for the asset). For example, edge server 120 can retrieve the log entry associated with a specific request (e.g., the request received in operation 205). In one embodiment, edge server 120 retrieves the log entry associated with the request received in operation 205 using the identifier generated in response to the receiving the request (e.g., a RayID or request identifier) or using other data from the request.

In operation 220, edge server 120 retrieves one or more characteristics of an asset of the web page from the log entry associated with the request for the web page, the asset having expected values for each of the one or more characteristics. In some embodiments, edge server 120 can access request characteristics database 177 to retrieve expected values for the one or more characteristics of an asset of the web page. In some embodiments, request characteristics database 177 stores characteristics to "well-known" assets. These "well-known" assets can include items on a web page that are commonly used or that rarely change. In some embodiments, these assets can be determined over time or be provided by a domain owner.

For example, edge server 120 identifies a version identifier for the JavaScript file in the response from origin server 130A from the log entry and a current, or expected, version identifier for the JavaScript files from the request characteristics database 177. In another example, edge server 120 identifies a size of the asset from the log entry and an expected size from the request characteristics database 177.

In operation 225, edge server 120 determines whether a value for a characteristic of the asset of the web page is not within a threshold range of an expected value for the characteristic of the asset. For example, edge server 120 determines whether the size of the asset in the response is equal to or within a range of an expected size. In an embodiment, edge server 120 retrieves the values for "clientRequestPath" and "edgeResponseBytes" from the log entry for the request from edge server request log 175 and compare the values to expected values from request characteristics database 177 to determine whether the size of the asset included in the response is equal to or within a range of an expected size. In some embodiments, in addition to, or in lieu of the size of the asset in the response, when the asset is a well-known or common asset, edge server 120 can compare a fingerprint of the asset in the response to a stored fingerprint, e.g., stored in request characteristics database 177.

In another embodiment, edge server 120 determines whether one or more characteristics from the response matches or is within a range of an expected value during a request process. For example, after receiving the request (e.g., as described in operation 205) and prior to, or concurrently with, sending a response to the request, edge server 120 evaluates the response to determine whether one or more characteristics from the response are as expected (e.g., asset size or fingerprint matches stored metadata for the asset).

When edge server 120 determines that there is at least one characteristic of the asset of the web page whose value is not within a threshold range of the expected value for that characteristic of the asset, the flow proceeds to operation 230. In such situations, edge server 120 can make the determination that origin server 130A is likely compromised.

When edge server 120 determines that there are all characteristics of the asset of the web page whose value that are within the respective threshold ranges of the expected values for the characteristics of the asset, the flow proceeds back to operation 205 where edge server 120 receives a subsequent request message.

In operation 230, edge server 120 performs a mitigation action in response to determining that origin server 130A is compromised. In some embodiment, possible mitigation actions can include generating and sending a notification message to the domain owners of resources hosted at origin server 130A. In some embodiments, possible mitigation actions can include blocking network traffic directed to or received from origin server 130A, e.g., for at least those network resources that are potentially compromised.

After performing the mitigation action in response to determining that the origin server has indications of being compromised, the flow proceeds back to operation 205 where edge server 120 receives a subsequent request message.

Figure 3:
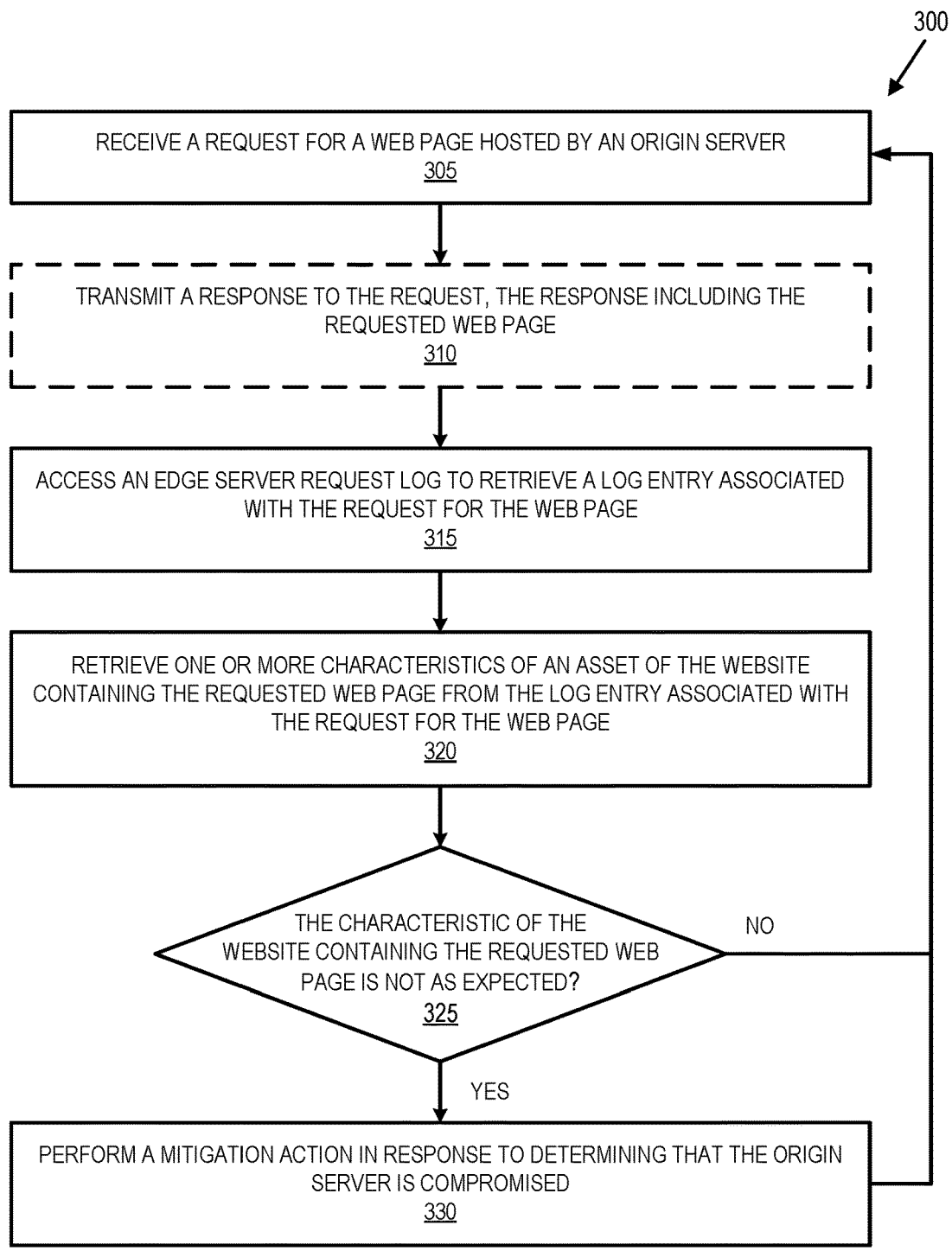
FIG. 3 is a flow diagram that illustrates exemplary operations for determining whether an origin server is compromised based on one or more characteristics of a resource requested from the origin server according to an embodiment.

FIG. 3 is a flow diagram 300 that illustrates exemplary operations for determining whether an origin server is compromised based on one or more characteristics of a resource requested from the origin server according to an embodiment. The operations of FIG. 3 will be described with reference to the exemplary embodiment of FIG. 1. However, it should be understood that the operations of FIG. 3 can be performed by embodiments of the invention other than those discussed with reference to FIG. 1, and the embodiments discussed with reference to FIG. 1 can perform operations different than those discussed with reference to FIG. 3. The operations of FIG. 3 are described as being performed by one or more edge servers (e.g., edge server(s) 120). In some embodiments, the operations are performed by compromised host detection module 170 operating on edge server(s) 120.

In operation 305, an edge server (e.g., edge server 120) receives a request for a resource (e.g., a web page) hosted by an origin server. In some embodiments, edge server 120 receives the request message from a client device (e.g., client device 110A) directed to an origin server (e.g., origin server 130A). Edge server 120 utilizes transport connection 140 to handle request messages from client device 110A and response messages directed to client device 110A (e.g., HTTP/S request/responses). For example, edge server 120 receives an HTTP "GET" request to access a resource hosted by origin server 130A via transport connection 140. In one embodiment, the requested resource is a web page (e.g., an HTML page) located at, e.g., www.example.com/index.html. The request message may include a request for an action to be performed on the resource. In one embodiment, edge server 120 receives the request message because of a DNS for the hostname resolving to an IP address assigned to edge server 120 instead of resolving to an IP address of the origin server hosting the resource.

In some embodiments, after receiving the request for the web page, edge server 120 generates a log entry in an edge server request log (e.g., edge server request log 175). In such embodiments, when edge server 120 receives the request, edge server 120 can store data related to the connecting client (e.g., client device 110A) and the request in the log entry, including, but not limited to, a client device type, a client IP address, the number of bytes in the client request, the host or origin server requested by the client, the URI path requested, the HTTP protocol of the request, the request path to the edge server, a timestamp of when the request was received, etc. In one embodiment, edge server 120 generates the log entry associated with the request for the web page with an identifier generated in response to the receiving the request or using data from the request.

In operation 310, edge server 120 transmits a response to the request, where the response includes the requested web page. In some embodiments, edge server 120 determines whether the requested web page is stored in a cache associated with, or otherwise accessible by, edge server 120. When edge server 120 determines that the web page requested by client device 110A is available in the cache, edge server 120 retrieves the web page from the cache. In such embodiments, edge server 120 can retrieve the requested web page from the cache without sending the request to origin server 130A. When edge server 120 determines that the web page requested by client device 110A is not available in the cache, or edge server 120 cannot access the requested web page in the cache, edge server 120 retrieves the requested web page from origin server 130A. For example, edge server 120 can send the HTTP request containing the "GET" request to origin server 130, and edge server 120 can receive an HTTP response back from origin server 130, via transport connection 150 established between origin servers 130A-N and edge server 120.

In some embodiments, as part of the process of transmitting the response to the request, edge server 120 stores data related to the response to the request in edge server request log 175. Edge server 120 can store the data related to the response to the request in the same log entry as edge server 120 previously stored data related to the request for the web page (as described in operation 305). The data related to the response stored in the log entry can include, but is not limited to, an IP address of the origin server, the number of bytes returned by the origin server, the number of bytes returned by the edge server to the client, the number of bytes returned by the cache, etc. In some embodiments, the data related to the response stored in the log entry also includes an SSL certificate for the website containing the requested web page.

In operation 315, edge server 120 accesses edge server request log 175 to retrieve a log entry associated with the request for the web page. In some embodiments, edge server 120 retrieves a specific log entry. In other embodiments, edge server 120 retrieves a plurality of log entries. For example, edge server 120 periodically (e.g., every five minutes, every thirty minutes, etc.) retrieves the log entries for a number of request/response processes that have been performed over an intervening amount of time since a prior retrieval. For example, edge server 120 can retrieve all or a subset of stored log entries for request/response processes from edge server request log 175. Each log entry in the edge server request log can include information regarding the request for the web page and information regarding the response to the request for the web page. Following retrieval of the stored log entries, edge server 120 can evaluate one or more responses to determine whether one or more characteristics from the one or more responses are as expected (e.g., asset size or fingerprint matches stored metadata for the asset). For example, edge server 120 can retrieve the log entry associated with a specific request (e.g., the request received in operation 305). In one embodiment, edge server 120 retrieves the log entry associated with the request received in operation 305 using the identifier generated in response to the receiving the request (e.g., a RayID or request identifier) or using other data from the request.

In operation 320, edge server 120 retrieves one or more characteristics of an asset of the website containing the requested web page from the log entry associated with the request for the web page. In an embodiment, the one or more characteristics of the asset of the website containing the requested web page includes a stored fingerprint of an SSL certificate, or other type of security certificate, for the website. For example, edge server 120 retrieves the SSL certificate fingerprint stored as the field value for "CertficateFingerprint" from request characteristics database 177. In some embodiments, the SSL certificate fingerprint is a unique identifier of the SSL certificate. In some embodiments, the unique identifier is generated using a hash function.

In operation 325, edge server 120 determines whether the one or more characteristics of the website containing the requested web page is as expected. For example, edge server 120 determines whether an SSL certificate for the website in valid. In an embodiment, edge server 120 uses the same hash function that was used to generate the stored SSL certificate fingerprint to generate a new SSL certificate fingerprint for the SSL certificate received in the response to the request. In such embodiments, edge server 120 then compares the generated SSL certificate fingerprint with the stored SSL certificate fingerprint from the "CertficateFingerprint" field from request characteristics database 177. When edge server 120 determines that there is SSL certificate is not valid, the flow proceeds to operation 330. In such situations, edge server 120 makes the determination that origin server 130A is likely compromised. When edge server 120 determines that there is SSL certificate is not valid, the flow proceeds back to operation 305 where edge server 120 receives a subsequent request message.

In another embodiment, edge server 120 determines whether one or more characteristics from the response matches or is within a range of an expected value during a request process. For example, after receiving the request (e.g., as described in operation 205) and prior to, or concurrently with, sending a response to the request, edge server 120 evaluates the response to determine whether one or more characteristics from the response are as expected (e.g., asset size or fingerprint matches stored metadata for the asset).

When edge server 120 determines that the characteristic of the website containing the requested web page is not as expected, e.g., the received SSL certificate is determined to be not valid based on the comparison of the generated SSL certificate fingerprint to the stored SSL certificate fingerprint, the flow proceeds to operation 330. In such situations, edge server 120 can make the determination that origin server 130A is likely compromised.

When edge server 120 determines that the characteristic of the website containing the requested web page is as expected, e.g., the received SSL certificate is determined to be valid, the flow proceeds back to operation 305 where edge server 120 receives a subsequent request message.

In operation 330, edge server 120 performs a mitigation action in response to determining that origin server 130A is compromised. In some embodiment, possible mitigation actions can include generating and sending a notification message to the domain owners of resources hosted at origin server 130A. In some embodiments, possible mitigation actions can include blocking network traffic directed to or received from origin server 130A, e.g., for at least those network resources that are potentially compromised.

After performing the mitigation action in response to determining that the origin server has indications of being compromised, the flow proceeds back to operation 305 where edge server 120 receives a subsequent request message.

Figure 4:
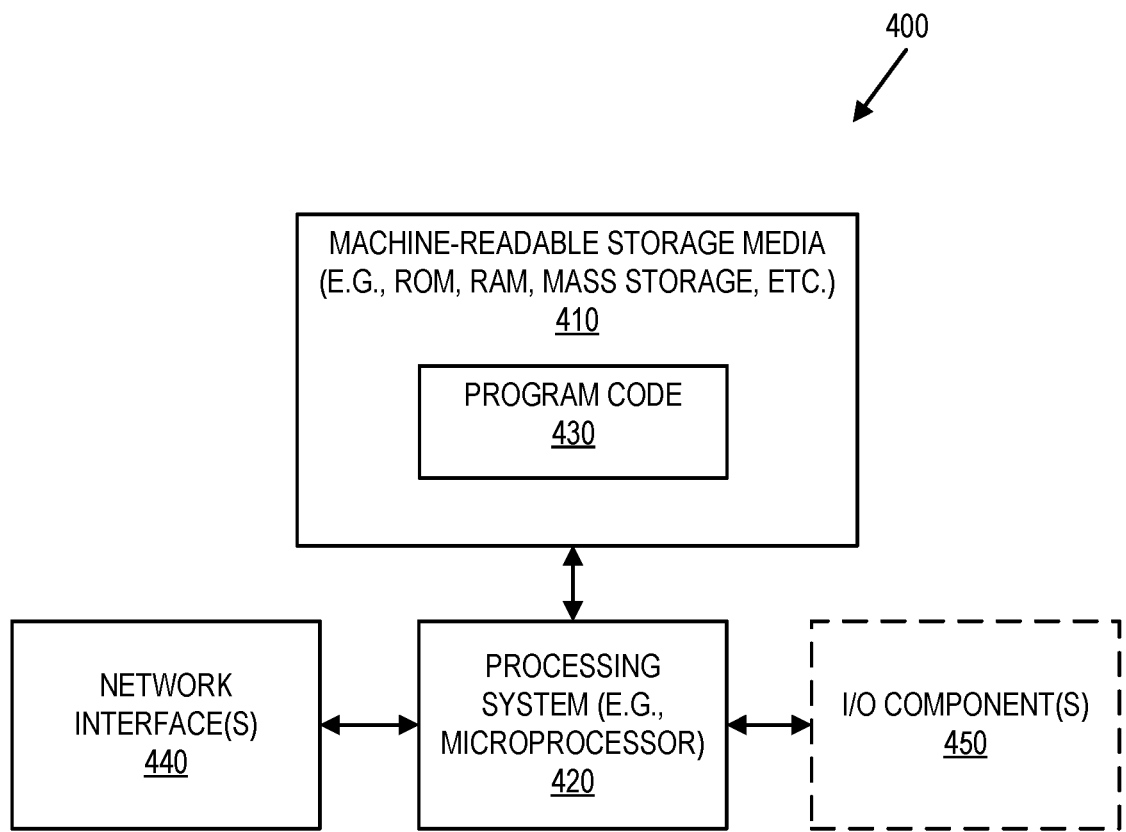
FIG. 4 illustrates a block diagram for an exemplary data processing system that may be used in some embodiments.

FIG. 4 illustrates a block diagram for an exemplary data processing system 400 that may be used in some embodiments. One or more such data processing systems 400 may be utilized to implement the embodiments and operations described with respect to the edge server, origin server, and/or client device.

The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 420. The processing system 420 may be one or more processors and/or connected system components such as multiple connected chips. The depicted machine-readable storage media 410 may store program code 430 that, when executed by the processor(s) 420, causes the data processing system 400 to perform the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown may be part of the system 400.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
   receiving, by an edge server, a request for a web page hosted by an origin server;
   transmitting a response to the request, the response including the web page;
   accessing an edge server request log to retrieve a log entry associated with the request for the web page, the log entry associated with the request for the web page including information regarding the request for the web page and the response to the request for the web page;
   retrieving a security element associated with a website from the log entry associated with the request for the web page, the website containing the web page;
   determining that the origin server is compromised when the security element is invalid; and
   performing a mitigation action in response to determining that the origin server is compromised.

2. The computer-implemented method of claim 1, wherein the security element is a security certificate, and wherein determining that the origin server is compromised when the security element is invalid further comprises:
  determining whether the security certificate associated with the website matches a stored fingerprint of the security certificate associated with the website; and
  determining that the security certificate does not match the stored fingerprint of the security certificate.

3. The computer-implemented method of claim 2, wherein determining whether the security certificate associated with the website matches the stored fingerprint of the security certificate associated with the website comprises:
  generating a fingerprint of the security certificate from the log entry associated with the request for the web page; and
  comparing the generated fingerprint of the security certificate to the stored fingerprint of the security certificate.

4. The computer-implemented method of claim 1, wherein the mitigation action includes blocking network traffic associated with the website.

5. The computer-implemented method of claim 1, further comprising:
  identifying the log entry associated with the request for the web page using a request identifier associated with the request; and
  storing the information regarding the response to the request for the web page in the log entry associated with the request for the web page.

6. The computer-implemented method of claim 1, wherein accessing the edge server request log to retrieve the log entry associated with the request for the web page comprises:
  determining that a defined amount of time has elapsed since a previous retrieval from the edge server request log; and
  retrieving one or more log entries from the edge server request log, the one or more log entries generated in the defined amount of time since the previous retrieval from the edge server request log.

7. A non-transitory machine-readable storage medium that provides instructions that, when executed by a processor, cause said processor to perform operations comprising:
  receiving, by an edge server, a request for a web page hosted by an origin server;
  transmitting a response to the request, the response including the web page;
  accessing an edge server request log to retrieve a log entry associated with the request for the web page, the log entry associated with the request for the web page including information regarding the request for the web page and the response to the request for the web page;
  retrieving a security element associated with a website from the log entry associated with the request for the web page, the website containing the web page;
  determining that the origin server is compromised when the security element is invalid; and
  performing a mitigation action in response to determining that the origin server is compromised.

8. The non-transitory machine-readable storage medium of claim 7, wherein the security element is a security certificate, and wherein determining that the origin server is compromised when the security element is invalid further comprises:
  determining whether the security certificate associated with the website matches a stored fingerprint of the security certificate associated with the website; and
  determining that the security certificate does not match the stored fingerprint of the security certificate.

9. The non-transitory machine-readable storage medium of claim 8, wherein determining whether the security certificate associated with the website matches the stored fingerprint of the security certificate associated with the website comprises:
  generating a fingerprint of the security certificate from the log entry associated with the request for the web page; and
  comparing the generated fingerprint of the security certificate to the stored fingerprint of the security certificate.

10. The non-transitory machine-readable storage medium of claim 7, wherein the mitigation action includes blocking network traffic associated with the website.

11. The non-transitory machine-readable storage medium of claim 7, further comprising:
  identifying the log entry associated with the request for the web page using a request identifier associated with the request; and
  storing the information regarding the response to the request for the web page in the log entry associated with the request for the web page.

12. The non-transitory machine-readable storage medium of claim 7, further comprising: wherein accessing the edge server request log to retrieve the log entry associated with the request for the web page comprises:
  determining that a defined amount of time has elapsed since a previous retrieval from the edge server request log; and
  retrieving one or more log entries from the edge server request log, the one or more log entries generated in the defined amount of time since the previous retrieval from the edge server request log.

13. An apparatus, comprising:
  a processor;
  a non-transitory machine-readable storage medium coupled with the processor that stores instructions that, when executed by the processor, causes said processor to perform the following:
  receive a request for a web page hosted by an origin server;
  transmit a response to the request, the response including the web page;
  access an edge server request log to retrieve a log entry associated with the request for the web page, the log entry associated with the request for the web page including information regarding the request for the web page and the response to the request for the web page;
  retrieve a security element associated with a website from the log entry associated with the request for the web page, the website containing the web page;
  determine that the origin server is compromised when the security element is invalid; and
  perform a mitigation action in response to determining that the origin server is compromised.

14. The apparatus of claim 13, wherein the security element is a security certificate, and wherein the instructions to determine that the origin server is compromised when the security element is invalid further cause said processor to perform the following:

determine whether the security certificate associated with the website matches a stored fingerprint of the security certificate associated with the website; and determine that the security certificate does not match the stored fingerprint of the security certificate.

15. The apparatus of claim 14, wherein determining whether the security certificate associated with the website matches the stored fingerprint of the security certificate associated with the website comprises:

generating a fingerprint of the security certificate from the log entry associated with the request for the web page; and comparing the generated fingerprint of the security certificate to the stored fingerprint of the security certificate.

16. The apparatus of claim 13, wherein the mitigation action includes blocking network traffic associated with the website.

17. The apparatus of claim 13, wherein the instructions further cause said processor to perform the following:

identify the log entry associated with the request for the web page using a request identifier associated with the request; and store the information regarding the response to the request for the web page in the log entry associated with the request for the web page.

18. The apparatus of claim 13, wherein accessing the edge server request log to retrieve the log entry associated with the request for the web page comprises:

determining that a defined amount of time has elapsed since a previous retrieval from the edge server request log; and retrieving one or more log entries from the edge server request log, the one or more log entries generated in the defined amount of time since the previous retrieval from the edge server request log.

* * * * *